US006634222B2

(12) United States Patent
O'Brien et al.

(10) Patent No.: US 6,634,222 B2
(45) Date of Patent: Oct. 21, 2003

(54) SYSTEM FOR REMOVING VEHICLES HAVING UNSAFE TIRES FROM PUBLIC ROADWAYS

(76) Inventors: Patrick Michael O'Brien, 1670 SW. Sunset, Portland, OR (US) 97201; Stacy Renee Fogarty, 19475 W. 167th, Olathe, KS (US) 66062; John Michael O'Brien, 9385 SW. Iowa Dr., Tualatin, OR (US) 97062

( * ) Notice: Subject to any disclaimer, the term of this patent is extended or adjusted under 35 U.S.C. 154(b) by 0 days.

(21) Appl. No.: 10/053,137

(22) Filed: Jan. 17, 2002

(65) Prior Publication Data

US 2003/0131660 A1 Jul. 17, 2003

(51) Int. Cl.[7] .................. G01M 17/00
(52) U.S. Cl. .................. 73/146; 152/154.2
(58) Field of Search .................. 73/146; 152/330, 152/524, 154.2

(56) References Cited

U.S. PATENT DOCUMENTS 2,102,784 A * 12/1937 Bridges
3,261,388 A 7/1966 Kovac
3,516,467 A 6/1970 Sims
3,578,055 A 5/1971 French
3,653,422 A 4/1972 French
3,770,040 A 11/1973 DeCicco
3,814,160 A 6/1974 Creasey
4,074,742 A 2/1978 Chamblin
4,144,921 A 3/1979 Yabuta
4,226,274 A 10/1980 Awaya
H1283 H 2/1994 Porto et al.
5,704,999 A 1/1998 Lukich
6,003,576 A 12/1999 Auxerre
6,062,283 A 5/2000 Watanabe
6,093,271 A 7/2000 Majumdar

* cited by examiner

*Primary Examiner*—Hezron Williams
*Assistant Examiner*—Alandra Ellington
(74) *Attorney, Agent, or Firm*—Robert L. Harrington; Schwabe Williamson & Wyatt

(57) ABSTRACT

A four step process for removing vehicles from the public roadways having worn tires including (a) establishing a standard for end of life tire conditions, (b) converting the standard to relate correspondingly to tread wear, (c) providing a visual indication of end of life tread wear and (d) providing for inspection and vehicle disqualification where end of life tire wear is indicated.

4 Claims, 3 Drawing Sheets

Control Body For Control Region Adopts Universal Standard

↓

Adapt Or Convert Standard To Individual Tires

↓

Produce and Sell Only Tires In Compliance With Universal Standard

↓

Generate Public Awareness Of Indicator For Worn Tires 28
24
22
14
16

Figure 6:
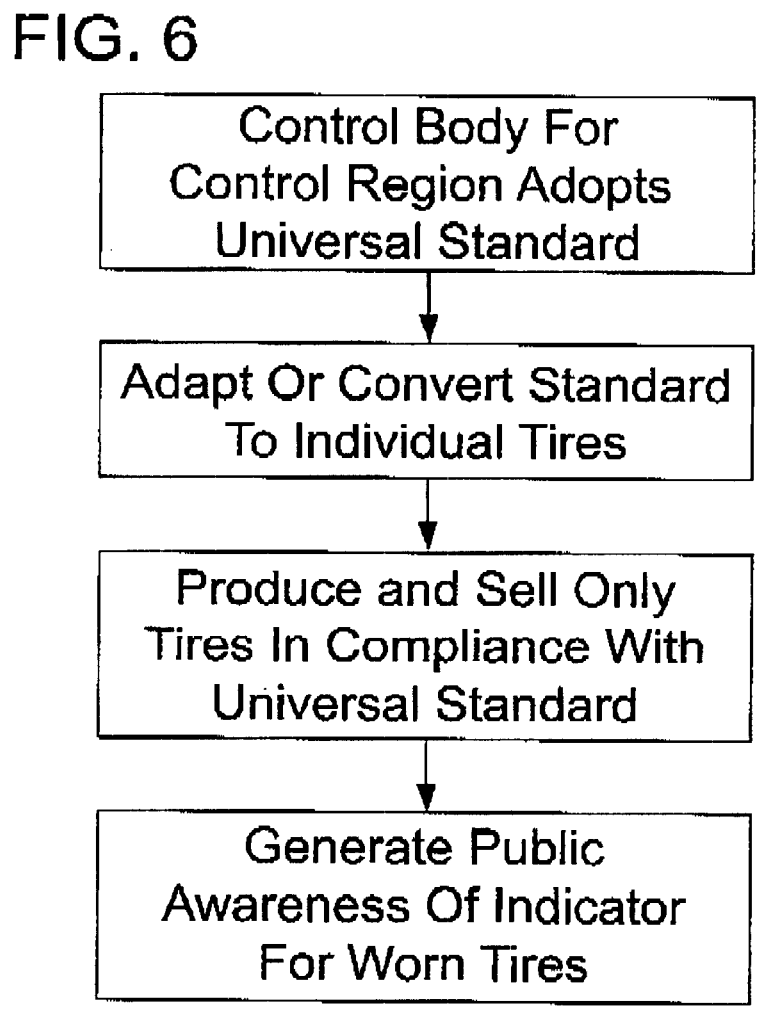

Control Body For Control Region Adopts Universal Standard

↓

Adapt Or Convert Standard To Individual Tires

↓

Produce and Sell Only Tires In Compliance With Universal Standard

↓

Generate Public Awareness Of Indicator For Worn Tires

SYSTEM FOR REMOVING VEHICLES HAVING UNSAFE TIRES FROM PUBLIC ROADWAYS

FIELD OF THE INVENTION

This invention relates to a uniform system for visually determining unsafe tire wear on vehicles and the removal of such vehicles from roadways.

BACKGROUND OF THE INVENTION

A major concern for automobile safety is the condition of the tires that are mounted on a vehicle. A vehicle that is traveling at 60–80 miles per hour and having a tire failure can and often does produce devastating consequences.

It is, of course, to the benefit of every vehicle owner to insure that his vehicle's tires are in a safe condition and there are a number of proposals in the prior art to enable a vehicle owner to ascertain the safe condition of his vehicle's tires. Unfortunately, many vehicle owners are either unaware of their tire's condition or careless in their concern for unsafe tire conditions and it is the unaware or careless vehicle owner that creates a safety hazard for all drivers that share a common roadway.

BRIEF DESCRIPTION OF THE INVENTION

The present invention provides a method or system that enables a control body having regulatory control in a region of control (e.g., via state, national or international regulation) over the use of tires on vehicles that become worn to an unsafe or near unsafe condition.

The first step of a preferred method of the invention is the development of a tire manufacturing standard applicable to substantially all vehicle tires regardless of tire size and regardless of vehicle size and type. It is known that different categories of vehicles will be equipped with different categories of tires. Thus, the tire manufacturing standard of the preferred embodiment is to be characterized in a way that encompasses all tires produced by all tire manufacturers. An example of such a standard is one that defines "end of life" in a manner that can be converted to tread wear. Regardless of how much tread a tire has, how tough the tread material is or how much abuse the tire suffers, the tire will simply wear to a point of having minimal remaining tread beyond which the tire is deemed unsafe. That point of minimal remaining tread can be predictably established for each tire manufactured and for the purpose of explanation is here referred to as "end of life."

The second step is the requirement that all tires are to be provided with a universal visual code (e.g., color code) indicative of "end of life" or near "end of life" condition. For example, it may be determined that a tread that is 95% used (leaving 5% unused) is no longer safe. Alternatively it may be determined that a tread that has a thickness no greater than 2/32 of an inch is no longer safe. Whatever the designation of unsafe condition, every tire will be required to expose a common visual indicator/coding at a tread depth that coincides with the determined unsafe tire wear condition.

The third step is a deterrent step whereby vehicles that have tires worn to the point of "end of life" condition are deterred from use on public roadways. This may require the passing of state and/or national or international regulations that prohibit vehicles on the road that visually demonstrate tire wear to be unsafe as determined by the adopted visual coding. Alternatively, the stigma generated by public concern may itself be an effective deterrent.

The fourth step is enforcement which can be readily achieved by visual inspection. An officer stopping a vehicle or viewing it at some distance can routinely and readily inspect the tires. Alternatively and/or additionally, such can take place at inspection sites, e.g., when renewing a license for the vehicle or when paying toll road charges, etc. Even other motorists who notice the "end of life" code on a vehicle's tires can report abuses and/or voice concern to vehicle drivers and will be encouraged to do so for the common safety of all users of public roadways.

Alternatively, it may be desired to have a color coding scheme that includes a second visual indication, e.g., to pre-warn drivers of an impending "end of life" condition. For example, a color red will denote that the tire has reached or exceeded "end of life," and prior to end of life, the color yellow or orange can be used to warn drivers that "end of life" is approaching.

Additionally, uneven wearing tire tread is often caused when the wheels are out of alignment. This often unnoticed condition is a major cause of tire failure and vehicle accident. As an example, if one edge of a tire (often inside versus outside edges) is wearing much more than the rest of the tire and is easily hidden from view, it presents a significant danger. The appearance of a cautionary bright color (yellow/orange/amber) on that inside edge is a powerful tool for both the driver and public safety officials to head off tragedy. The appearance, even of a strand of "end of life" color code (red), would be immediate cause for replacement of the tire because of the close proximity of the end of life colored tread to the tire casing.

Whereas the use of color coding to designate a worn tire has been previously suggested, such applies to an individual vehicle owner and does not address the public safety issue. The present invention is directed to a system that enfranchises the entire driving populace/government to remove a source of public danger.

The invention will be more fully appreciated upon reference to the following detailed description and the accompanying drawings referred to therein.

DESCRIPTION OF THE DRAWINGS

FIG. 6 illustrates the method steps of the invention for removing vehicles having dangerously worn tires from public roadways.

DETAILED DESCRIPTION

Figure 1:
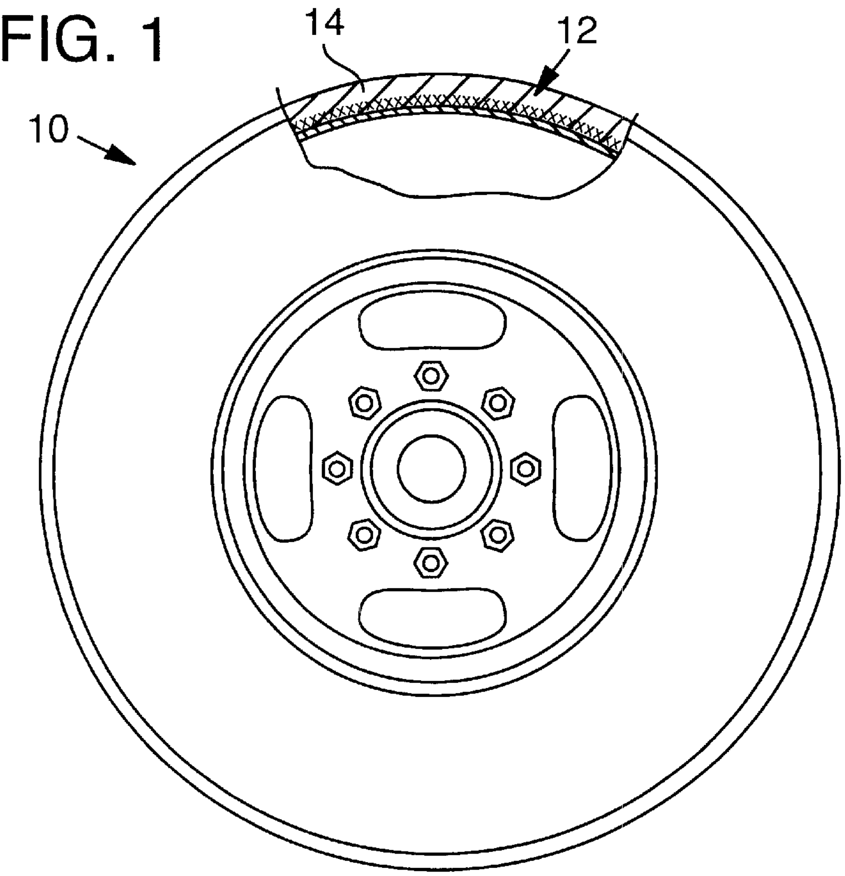
FIG. 1 is a side view of a tire having a section removed so as to provide a section view of the tread of the tire having been visually coded in accordance with the invention.
Figure 2:
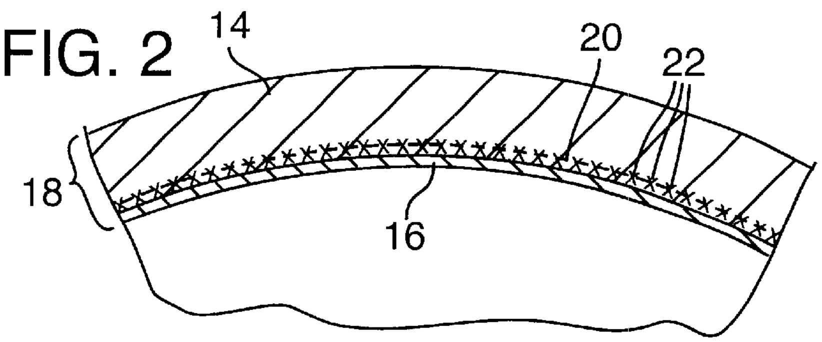
FIG. 2 is an enlargement of the section view portion of FIG. 1.

Reference is first made to FIGS. 1–5 which illustrate a manner of tire wear detection. FIG. 1 illustrates a vehicle tire 10 with a portion of the tire wall removed as indicated by reference 12. Such exposes the circumferential road-engaging wall portion 18 of a tire which is shown in more detail in FIG. 2.

The wall portion 18 is in general made up of a casing 16 and tread 14 that is secured to the casing as by vulcanization, a process well known to the industry. It is generally determined that an "end of life" condition is reached when the tread 14 wears down to a pre-determined minimal thickness which is indicated in the drawings by dash line 20. The tread material in and about the "end of life" designation is colored (or otherwise visually indicated), e.g., by the color red represented in FIG. 2 by x's (reference 22).

A number of alternatives may be adopted for visual identification of the "end of life" condition. The red coloring may be applied to the tread so as to appear just prior to being worn down to dash line 20. It is desirable that such prior or pre-warning is sufficient to provide the vehicle owner with sufficient safe driving to conveniently replace the tire. Tires may well wear unevenly or the color may not be applied precisely along the designated depth and thus a smattering of red may show for some time before turning to a solid red color, thus providing the desired pre-warning and yet clearly indicating when that point is reached (solid red) when driving is no longer safe. Another way to provide pre-warning may be to provide increased deepening of the color, e.g., a more pink appearing color graduating to a deeper or blood red as the danger of tire failure progresses.

Figure 3:
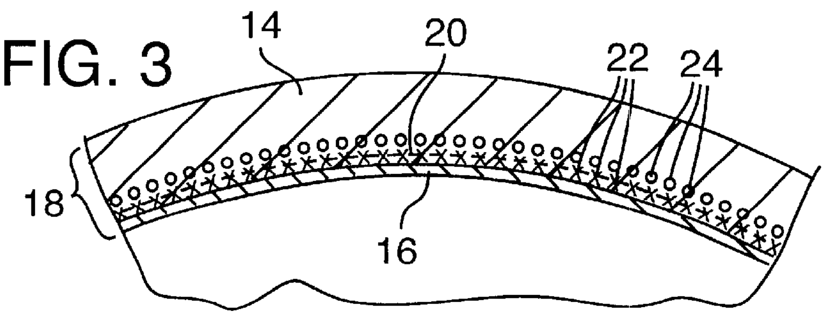
FIG. 3 is a view similar to FIG. 2 but of an alternate embodiment.

Other methods are also available, one being indicated in FIG. 3. The same end of life designation applies, i.e., the establishment of a tread wear depth indicated by dash line 20. The end of life visual indication, e.g., red color, is applied (either solid color or shade increasing color) preceded at a substantially shallower depth by a different color coding, e.g., the color yellow (indicated in FIG. 3 by circles 24) which begins to show well prior to "end of life" and thereby the driver has warning that the danger portion of the tread wear is being approached.

Figure 4:
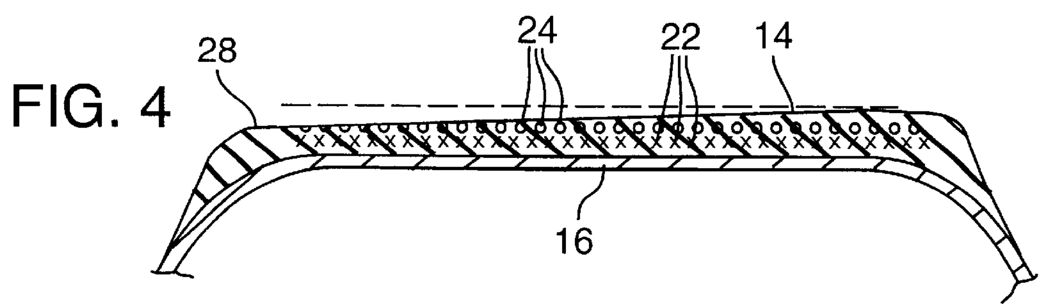
FIGS. 4 and 5 illustrate the tire tread of FIG. 3 in a worn condition as may occur with the wheel misaligned.
Figure 5:
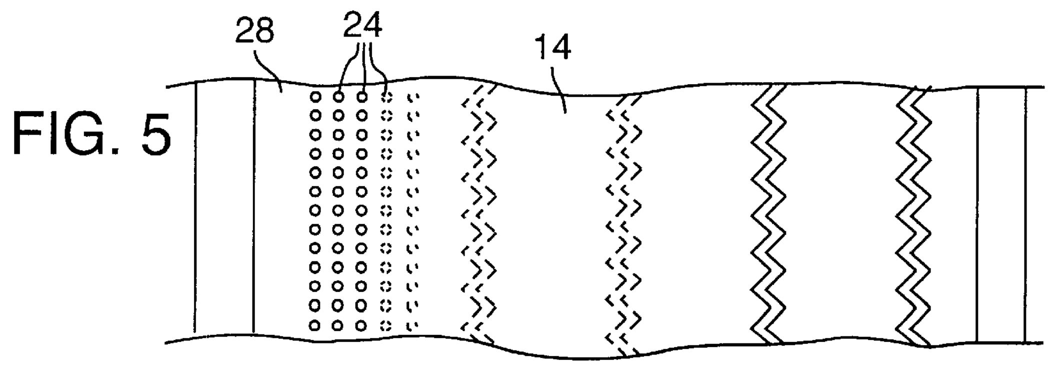

FIGS. 4 and 5 illustrate how the color coding using red and yellow indicators can also assist in determining wheel misalignment. As the tire wears, if the wheel is out of alignment, the tread at one edge 28 will wear down to expose the color yellow 24 while the opposing edge remains black, and the vehicle driver will readily determine an uneven wearing likely caused by wheel misalignment. FIG. 6 is a frontal view of a tire wherein the color yellow 24 is exposed at edge 28 to indicate uneven tire wear. Of course other color codes can be incorporated to provide earlier indication of uneven tire wear. The present invention is, however, intended to avoid significant added cost to the manufacture of tires and the preferred embodiment utilizes the primary danger color indication of red and additionally the cautionary color indication of yellow.

A potential concern is the preventative visual exposure of yellow and/or red as a result of the tread depth having these colors exposed within the tire grooves. To avoid this occurrence, the tire surface and particularly within the tire grooves, can be covered by a permanent black pigment or other blackening substance such that no warning color (yellow or red) is observed until such time as the tire actually wears to the cautionary or warning tread depth.

Reference is now made to FIG. 6 which illustrates a four step method of the invention for obviating or alleviating the use of "end of life" tires on vehicles used on public roadways and the hazard caused thereby.

Step 1 is indicated at box 30 and labeled "Universal Standard." By "Universal" is meant any agency having the ability to establish safety standards for public highways in a designated region. It could be a national or international agency or even the self-regulation of an industry such as a co-op of tire manufacturers. What is required is for tire manufacturers to make such a system available voluntarily or the adoption of a regulation that requires tire manufacturers to provide visual indication of "end of life (or near "end of life") tire wear. "End of life" is subject to alternative definitions. Certainly total removal of tread can be "end of life." However, a tire that reaches such condition may be considered beyond the point of early or pre-warning and such early warning is highly desirable. That is, a totally worn tire is an immediate danger. Preferably the standard provides for a pre-warning, e.g., including the last 5% of tire wear or at a point where the tire can be safely driven for some period of time or distance to enable a driver to conveniently and expeditiously seek tire replacement. Whatever the standard, it should be subject to being translated into tread wear depth, e.g., a thickness of tread overlying the casing.

Step 2 is indicated at box 32 and indicates the need for the tire manufacturer to convert or adapt the standard to their manufacturing process. Note that a tire to be applied to a ten ton truck will be configured far differently than a tire to be applied to a small passenger car. In between are tires for large and small trucks, pick ups, vans, SUV's and large cars. Whatever the tire configuration, the manufacturer needs to be able to determine, based on the standards established in Step 1, where in the tread depth a selected visual indication is to be applied. Note that a part of the standard adopted for Step 1 is the visual indicator that denotes "end of life." It is contemplated that the color red would be the most widely recognized color for danger and is the preferred visual indicator for the process of the present invention. Once the standard for "end of life" is determined and the tread wear depth for a particular tire whereat that "end of life" condition occurs, it is only necessary that the tire manufacturer incorporate into his tire manufacturing process a coloring dye or color laminate or whatever that will visually expose the colored red rubber cured into that portion of the tire upon wearing of the tire to that tread depth.

Having established a standard and having made possible that standard within the tire manufacturing process, the next step 34 is the adoption of a vehicle safety regulation by an appropriate agency that prevents or at least discourages continued driving of a vehicle equipped with tires worn to an "end of life" condition. The public at large would be made aware of this tire wear designation and in large measure that knowledge itself could provide the desired regulation of drivers. Preferably the regulations allow some pre-warning. If yellow is adopted as a pre-warning indicator, upon showing of red the tire may be determined as immediately dangerous and restricted from any further driving. Alternatively, red coloring of the tread may include black striping that shows at a depth farther down from the initial red showing as an indication of immediate danger as opposed to approaching danger.

The final step (box 36) provides enforcement. With the above steps in place, a visual inspection, even at a distance, will establish tire wear "end of life." Such inspection can be readily achieved in a number of ways. Many states require inspection upon being relicensed. Adding visual inspection of the tires would add no additional expense and minimal added inspection time. Stopping a vehicle for any type of infraction could automatically include tire inspection. Driving through parking lots, viewing tires of vehicles slowing to pass through toll gates and on and on. There are a hundred different ways to achieve inspection. Because tire wear is a matter of general public protection, the public would likely be encouraged to report "end of life" tire wear. By making drivers more cognizant of their tire wear condition, and with nothing more, such would dramatically reduce the use of unsafe tires.

The above explanation outlines an effective method for removing vehicles from public roadways. There are many variations that can be made in each of the four steps. In brief, step 1 is a universal standard for determining “end of life” condition. Step 2 is the adaptation of that standard to each tire manufacturer’s manufacturing process, i.e., determining for each tire the point of wear whereat “end of life” is reached in tread wear depth. Step 3 is the adoption of a universal visual (e.g., color) code that will enable low enforcement officials and the public in general to identify such end of life tire wear condition. Step 4 is providing the enforcement to prevent or remove vehicles having worn tires from the roadway. Accordingly the following claims are to be interpreted in this broad context and are intended to cover the various alternatives for achieving the process as outlined herein.

The invention claimed is:

1. A method of implementing safety on public roadways in a region of control wherein a control body controls the structure of tires mounted on vehicles driven on public roadways in said region of control, said method comprising:

said control body adopting a standard for determining end-of-life tire wear condition that applies to all vehicle tires regardless of tire size and type which tires are to be used on public roadways within the region of control;

determining tread wear depth for each vehicle tire size and type to be used on the public roadways in the region of control whereat each of said tires is individually determined to be at said end-of-life;

said control body requiring that all vehicle tires to be used on the public roadway in the region of control include a common visual indicator in the tire tread at said determined tread wear depth whereby casual observation of said tires will visually determine a condition of end-of-life; and generating public awareness that exposure of said visual indicator indicates a tire’s worn condition.

2. A method as defined in claim 1 which further includes:

(e) provision of a second color coding applied to a portion of the tire tread preceding end of life condition as an indication of the approach of end of life condition.

3. A method as defined in claim 2 wherein the color coding for end of life is the color red and the second color coding is the color yellow, amber or orange.

4. A method as defined in claim 2 which further includes:

(f) provision of a color coding scheme at different tread wear depths to indicate uneven tread wear.

* * * * *

UNITED STATES PATENT AND TRADEMARK OFFICE

CERTIFICATE OF CORRECTION

PATENT NO. : 6,634,222 B2
DATED : October 21, 2003
INVENTOR(S) : O'Brien et al.

It is certified that error appears in the above-identified patent and that said Letters Patent is hereby corrected as shown below:

Column 6,
Line 16, "(e) provision of a second color coding applied to a portion" should read -- provision of a second visual indicator applied to a portion --.
Line 19, "claim 2 wherein the color coding for end of life is the color red and the second color coding is the color" should read -- claim 2 wherein the visual indicator for end of life is the color red and the second visual indicator is the color --.
Line 23, "(f) provision of a color coding scheme at different tread" should read -- provision of a visual indicator scheme at different tread --.

Signed and Sealed this

Thirteenth Day of July, 2004

JON W. DUDAS
*Acting Director of the United States Patent and Trademark Office*